United States Patent [19]

McBee et al.

[11] 4,311,826

[45] Jan. 19, 1982

[54] MODIFIED SULFUR CEMENT

[75] Inventors: William C. McBee; Thomas A. Sullivan, both of Boulder City, Nev.

[73] Assignee: The United States of America as represented by the United States Department of Commerce, Washington, D.C.

[21] Appl. No.: 85,450

[22] Filed: Oct. 16, 1979

[51] Int. Cl.$^3$ ............................................. C08G 75/16
[52] U.S. Cl. ................................. 528/389; 260/42.13; 260/42.18; 260/42.32; 260/42.47
[58] Field of Search .......................................... 528/389

[56] References Cited

U.S. PATENT DOCUMENTS 2,806,843  9/1957  Welch .................................. 528/389
4,025,352  5/1977  Leutner et al. ....................... 106/70
4,058,500  11/1977 Vroom .............................. 260/42.24
4,190,460  2/1980  Cassar ............................ 106/287.32

OTHER PUBLICATIONS

Sulphur Institute Journal, pp. 6-8, 1976.
Sulphur Research & Development, pp. 20-21, 1978.
Sulphur Institute Journal, pp. 12-14, 1975.
Sulphur Research & Development, pp. 4-8, 1979.
Gregor et al., Sulphur Concrete, pp. 54-55, 68-77, 1978.
Sulphur Concrete and Coatings, Sudic No. 4, Raymont.
Bordoloi et al., New Uses of Sulphur-II, pp. 31-53, 1978.
Blight et al., New Uses of Sulphur-II, Spring 1977, pp. 15-30.
Diehl, New Uses for Sulphur and Pyrites, Madrid Symposium, May 1976.
McBee et al., Utilization of Secondary Sulfur in Construction Materials, 1976.
Sullivan et al., Development and Testing of Superior Sulfur Concretes, 1976.
Sullivan et al., Sand-Sulfur-Asphalt Paving Materials, 1975.
Sullivan et al., Sulfur in Coatings and Structural Materials, Advance in Chemistry, No. 140.

Primary Examiner—Harold D. Anderson
Attorney, Agent, or Firm—Oblon, Fisher, Spivak, McClelland & Maier

[57] ABSTRACT

A modified sulfur cement comprising the polymeric reaction product of elemental sulfur and a cyclopentadiene oligomer containing reactant.

Cement compositions can be formulated by blending an aggregate material with the modified sulfur cement.

7 Claims, 1 Drawing Figure

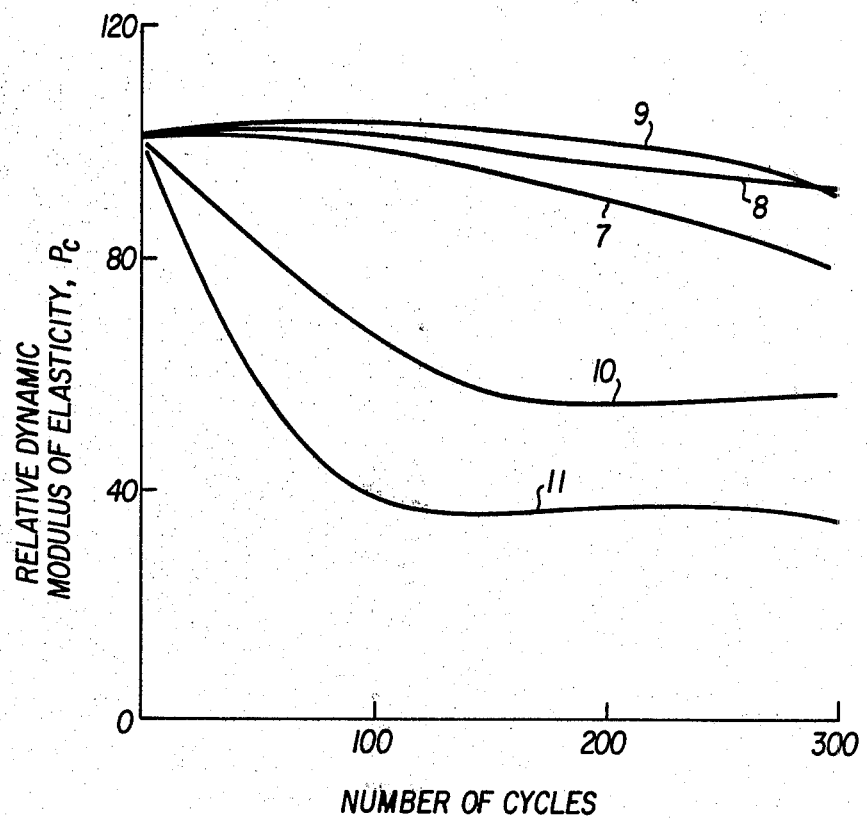

MODIFIED SULFUR CEMENT

BACKGROUND OF THE INVENTION

1. Field of the Invention

The present invention relates to sulfur containing cement compositions. More particularly, the invention relates to a cement composition based upon compounds of sulfur with cyclopentadiene.

2. Description of the Prior Art

The use of sulfur in the preparation of construction materials had been proposed as early as just after World War I when an acid resistant mortar compound of 40% sulfur binder mixed in 60% sand was prepared. However, upon thermal cycling such mortars exhibit a loss in flexural strength resulting in failure of the mortars. The use of sulfur as a binder in the preparation of concretes when combined with an agregate such as crushed rock or gravel has also been investigated. However, after solidification the sulfur in these concretes undergoes allotropic transformation wherein the sulfur reverts to the more dense orthorhombic form which results in a product that is highly stressed and therefore vulnerable to failure by cracking.

Improvements in sulfur based cement formulations have been achieved by adding a modifier component to the cement formulations. Diehl (New Uses For Sulfur and Pyrites, Madrid Symposium of the Sulfur Institute, 1976) has shown improved sulfur concrete formulations by the addition of small quantities of dicyclopentadiene as a modifier to the sulfur. Such modified cement formulations exhibit improved compressive strength characteristics.

McBee et al in the Utilization of Secondary Sulfur In Construction Materials (Proceedings of the Fifth Mineral Waste Utilization Symposium, 1976) have shown a variety of sulfur cement formulations such as sulfur concretes, sand-sulfur-asphalt paving and the like wherein the sulfur binder component is modified by the presence of small quantities of dicyclopentadiene. Sullivan et al in the Development and Testing of Superior Sulfur Concretes, 1976 and in studies of Sand-Sulfur-Asphalt Paving Materials, 1975 (both Bureau of Mines Reports of Investigations) have also described various sulfur cement formulations in which the sulfur binder is modified with dicyclopentadiene. Sullivan et al in Sulfur In Coatings and Structural Materials, Advances In Chemistry No. 140 have also described sulfur cement formulations in which dicyclopentadiene, dipentene, methylcyclopentadiene, styrene and an olefinic liquid hydrocarbon were investigated as modifiers. While the modification of sulfur cement formulations with various unsaturated hydrocarbon materials results in cement formulations of improved characteristics, nevertheless a need has continued to exist for modified sulfur cement formulations of improved freeze-thaw stability and strength characteristics.

SUMMARY OF THE INVENTION

Accordingly, one object of the present invention is to provide a sulfur modified cement which possesses excellent strength and freeze-thaw stability characteristics.

Briefly, this object and other objects of the present invention as hereinafter will become more readily apparent can be attained by a modified sulfur cement composed of the polymeric reaction product of elemental sulfur and a cyclopentadiene oligomer containing reactant. A cement composition can be prepared by blending an aggregate material with the modified sulfur cement.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein the FIGURE is a graph showing the relative dynamic modulus profile of several sulfur containing concrete materials after repeated freeze-thawing cycles.

DETAILED DESCRIPTION OF THE PREFERRED EMBODIMENTS

Sulfur cement formulations are known in which sulfur is combined with an aggregate and the mixture is allowed to harden. The present invention concerns a modified sulfur cement which is the reaction product of sulfur with various forms of cyclopentadiene. Cement formulations can be prepared such as concrete by combining the sulfur modified cement with an aggregate.

The sulfur-cyclopentadiene cement component of the present invention is prepared by reacting molten sulfur with dicyclopentadiene (DCPD) and an oligomer of cyclopentadiene. Normally, the reaction is conducted without the presence of a solvent. However, such hydrocarbon materials as vinyltoluene, styrene, indene ad γ-methyl styrene can be used as solvents.

The reaction between sulfur and cyclopentadiene dimer to form the modified sulfur component of the cement must be carefully controlled because of the exothermicity of the reaction between sulfur and dicyclopentadiene. Cyclopentadiene is commercially available in the form of the dimer thereof. Liquid cyclopentadiene dimer will spontaneously depolymerize to the monomer at room temperature. This depolymerization reaction will accelerate greatly in the presence of sulfur at an elevated temperature of 120°–140° C. as shown by the following reaction.

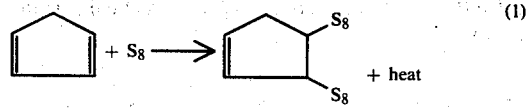

Because of the exothermicity of reaction (1) it is difficult to control. However, when the dimer is present in the reaction mixture, the dimer reacts with the polysulfide product formed in reaction (1) as shown below in reaction (2)

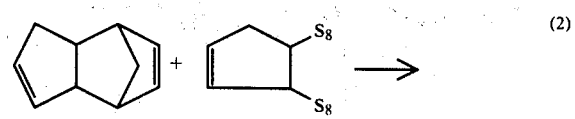

-continued

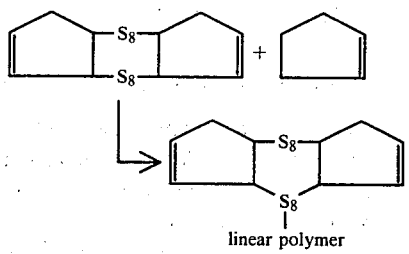

linear polymer

Reaction (2) between cyclopentadiene dimer and the polysulfide-cyclopentadiene product is significantly less exothermic than reaction (1). However, it is still difficult to control. It is evident from the above discussion that the combined exothermicity of reactions (1) and (2) poses significant control problems, because if control of the reactions is not maintained, extensive apparatus damage will occur and an undesirable, highly viscous rubber-like polymer if formed. On the other hand, when control of the reactions is maintained as it is in the present invention, by the procedure described below, the reactions result in the formation of linear polymeric polysulfides which are the essential components of the durable cement of the present invention.

In the preparation of the polymeric modified sulfur cement of the present invention, the desired control of the above exothermic reactions is achieved by conducting the reaction between sulfur and dicyclopentadiene in the presence of a quantity of cyclopentadiene oligomer sufficient to achieve the desired linear polysulfide polymeric products. Generally, the amount of oligomer in the reaction mixture based upon the total amount of cyclopentadiene present ranges from 10 to 100 wt. %. If low levels of the reaction mixture, i.e. <10%, are used in the reaction with sulfur, it may be necessary to add small amounts, i.e., 10% to 30%, of dicyclopentadiene to the mixture in order to form the initial polysulfide-cyclopentadiene adduct which in turn reacts with the oligomer, although for some cements as little as 5% of the reaction mixture can be reacted with sulfur. This is necessary because the oligomer contains very little cyclopentadiene monomer. The reaction mixture generally contains 25 to 50% oligomer and 75 to 50% dicyclopentadiene. With quantities of the reaction mixture above 10%, the reaction between sulfur and oligomer proceeds spontaneously because small but sufficient quantities of cyclopentadiene monomer are present to promote the reaction. The reaction between oligomer and sulfur-cyclpopentadiene adduct can be illustrated as follows:

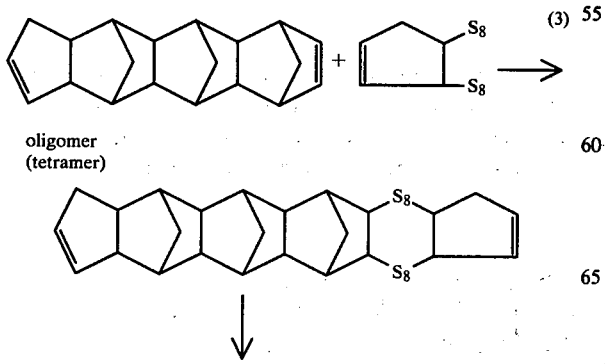

oligomer
(tetramer)

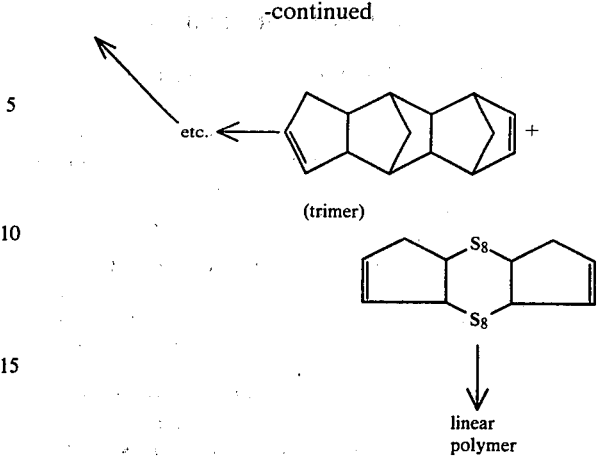

(trimer)

linear polymer

The reaction between the sulfur-cyclopentadiene adduct and the oligomer exhibits very low exothermicity becuase the oligomer breaks down very slowly to the final state of dicyclopentadiene. This is why the reaction is virtually non-exothermic and why the oligomer is used in the present reaction to moderate the polymerization of sulfur with cyclopentadiene.

In the reaction between sulfur and cyclopentadiene virtually any source of cyclopentadiene-oligomer can be used. These sources range from virtually pure cyclopentadiene oligomer mixtures to oligomer sources contaminated with other olefinic materials. Normally, cyclopentadiene oligomer is obtained from the production of dicyclopentadiene resin as steam sparge oils. These oils are the generally undesirable low molecular weight components of the system which are commonly disposed of as a fuel. In the manufacture of dicyclopentadiene resins, generally a crude form of dicyclopentadiene liquid is used as a feedstock for the reaction and is blended with crude vinyl aromatic streams rich in styrene, indene and α-methylstyrene, as well as vinyltoluene with about a 30–40% pure liquid dicyclopentadiene before polymerization. Thus, the actual sulfur containing polymer material obtained in the present invention by the use of such crude oligomer sources besides consisting of low molecular weight polymers of dicyclopentadiene, will also consist of dicyclopentadiene copolymers of vinyl aromatic compounds and some mixed vinyl aromatic polymers. A typical oligomer starting material is one which contains the following constituents: 5% cyclopentadiene, 10% each of dimer and trimer, 20% tetramer, 45% pentamer and 10% traces of higher polymers such as alkyl naphthalenes, vinyl dicyclopentadiene aromatic copylmers.

The reaction between sulfur and the combination is conducted at a temperature and for a time sufficient to promote and complete the reaction which is normally from 120° to 160° C., and a reaction time within the range of 1 to 15 hours. When the proper combination of oligomer and dicyclopentadiene as discussed above is employed, the exothermicity of the reaction between sulfur and cyclopentadiene material can be controlled. In other words, the violent mass reaction and exotherm exhibited upon reacting sulfur with dicyclopentadiene alone can be smoothly modulated into a controlled reaction by using cyclopentadiene oligomer with dicyclopentadiene. The amount of dicyclopentadiene relative to oligomer in the reaction normally ranges from 80 wt. % dicyclopentadiene — 10 wt. % oligomer to 0 wt. % dicyclopentadiene — 100 wt. % oligomer.

Generally speaking, in the preparation of a sulfur cement the amount of sulfur employed relative to cyclopentadiene reactants is sufficient to afford the desired linear polymer. Conveniently, the amount of sulfur used ranges from 55 to 98 wt. % relative to 45 to 2 wt. % of oligomer or oligomerdicyclopentadiene mixture.

The reaction can be conducted in any type of conventional reaction vessel although a sealed reactor is preferable but not essential. The product of the reaction is liquid above about 115° C. and therefore can be handled in liquid form at or above this temperature. The product cement is thermoplastic and solidifies below 115° C. The cement product can be stored in any type of storage container such as plastic or paper bags and any type of metal, glass or plastic container.

The sulfur-cyclopentadiene polymer cement of the present invention can be employed in a wide variety of applications similar to the uses of Portland and asphaltic cements. For example, the modified sulfur cement of the invention can be blended with any suitable conventional aggregate to prepare a sulfur concrete. The blending of the cement with the aggregate is accomplished at a temperature above that at which the cement becomes liquid. Normally, cement at a temperature of 125° C. to 150° C., preferably 130° C. to 150° C. is employed during blending. Suitable modified sulfur cement formulations can be prepared by blending 7 to 80% by wt. sulfur cement with 93% to 20% by wt. aggregate. For the preparation of a sulfur modified concrete, suitable aggregates include particulate granite, quartz, limestone, volcanic material and the like. In the preparation of mortar bases on the modified sulfur cement, from 40 to 50% by wt. of the sulfur cement is mixed with from 50% to 60% by wt. of a finely divided aggregate. Suitable common aggregates for mportar preparation include sand, mica, fiberglass, asbestos, silica flour, talc and the like. These same aggregates or fillers can be employed to form sulfur coating materials which can be applied on suitable surfaces by conventional application techniques such as by brushing, spraying, rolling or the like.

In the preparation of modified sulfur cement formulations satisfactory for use as in spray coatings from 80% to 90% by wt. sulfur cement is used in combinations with 5 to 20% by wt. finely divided aggregate.

When any of the above cement formulations are used in a particular application, the formulations rapidly set since the sulfur modified cement component is thermoplastic and solidifies within a few minutes.

Having generally described this invention, a further understanding can be obtained by reference to certain specific examples which are provided herein for purposes of illustration only and are not intended to be limiting unless otherwise specified.

EXAMPLE 1

A series of modified sulfur concrete materials were prepared by employing the amounts of ingredients shown in Table 1 below. Modified sulfur cements were prepared by reacting the amounts of sulfur, oligomer and dicyclopentadiene shown at 130° C. for 24 hours. The modified sulfur cements were then blended with the aggregates shown in the table at 140° C. The physical properties of the resulting cements are also shown in Table 1.

TABLE 1
PROPERTIES OF MODIFIED SULFUR CONCRETES

| Test No. | Aggregate Type (wt. pct) | Sulfur[1] wt. pct | Dicyclopentadiene wt-pct | Oligomer wt-pct | Strength, psi[2] Compressive | Tensile | Flexural |
|---|---|---|---|---|---|---|---|
| 1 | Quartz (77) | 23 | 2.50 | 2.50 | 4,885 | 630 | 1,010 |
| 2 | Quartz (77) | 23 | 3.75 | 1.25 | 6,180 | 715 | 1,230 |
| 3 | Quartz (77) | 23 | 3.25 | 1.75 | 4,920 | 685 | 740 |
| 4 | Limestone (79) | 21 | 2.50 | 2.50 | 6,710 | 985 | 1,230 |
| 5 | Limestone (79) | 21 | 3.75 | 1.75 | 8,170 | 1,020 | 1,570 |
| 6 | Limestone (79) | 21 | 3.25 | 1.25 | 7,300 | 825 | 1,480 |

[1]Sulfur modified by reaction with 5 wt-pct of dicyclopentadiene and oligomer.
[2]Strength values are the average of 3 samples' values.

EXAMPLE 2

A series of limestone based, sulfur cements were prepared in the same manner as described in Example 1 above employing the quantities of raw materials shown in Table 2 below. The sulfur concrete materials were employed in a series of freeze-thaw durability tests under prescribed test conditions (ASTM method C 666-73, Procedure A). Samples 7 to 9 represent concrete formulations based upon modified sulfur cement formulations within the scope of the invention, while samples 10 and 11 represent sulfur cement formulations outside the scope of the present invention.

TABLE 2
RESIDUAL STRENGTH AFTER FREEZE-THAW TESTING

| Samples | Sulfur Cements | Composition, pct (DCPD-Oligomer) | Limestone | Modulus of Rupture, psi Initial | Final | Residual Strength, pct |
|---|---|---|---|---|---|---|
| 1 | 21[1] | (75–25) | 79 | 1,570 | 1,430 | 91.0 |
| 8 | 21[1] | (65–35) | 79 | 1,480 | 785 | 53.0 |
| 9 | 21[1] | (50–50) | 79 | 1,230 | 865 | 70.3 |
| 10 | 21[1] | (100–0) | 79 | 1,235 | 470 | 38.0 |
| 11 | 24 | (0–0) | 76 | 810 | 285 | 35.2 |

[1]Sulfur modified by reaction with 5 wt.-pct of the indicated amounts of DCPD and oligomer.

The results of the tests are shown in the FIGURE. The FIGURE shows that concrete samples 7 to 9 withstood 300 freeze-thaw cycles (the maximum number of cycles prescribed in the standard test.) While maintaining 90% of the original dynamic modulus values. (The data in Table 2 show the initial and final modulus of rupture values of the various formulations as well as the residual strength values of the formulations.) The available data show that the modified sulfur concretes prepared from the reaction between sulfur and oligmer-dicyclopentadiene exhibit superior durability and residual strength than the concretes prepared from sulfur cements unmodified with cyclopentadiene based materials or modified only with dicyclopentadiene.

EXAMPLE 3

A modified sulfur cement formulation was prepared by reacting 95 wt. % sulfur with a 5 wt. % mixture of 3.25 wt. % dicyclopentadiene and 1.75 wt. % cyclopentadiene oligomer at 130° C. for 24 hours. An amount of 23 wt. % of the modified sulfur cement was mixed with 77 wt. % of quartz aggregate at 135° C. (275° F.). The freshly prepared concrete was then cast into molds to form the desired concrete slabs. Two of the prepared slabs (slabs 3 and 4 in Table 3 below each 4 ft. × 4 ft. × 4 in.) having the indicated strength properties are currently being tested in the corrosive floor environments of a muriatic acid plant and a langbeinite plant respectively where their resistance to corrosion characteristics and physical properties are being determined for comparative purposes with other sulfur based and Portland cement based concrete slabs. Two other prepared slabs designated as slab nos. 35 and 36 (2 ft. × 2 ft. × 2½in.) in Table 3 below were installed for test purposes in the corrosive environment of a zinc refinery plant. One slab (#35) was installed in an oxide plant while the other was installed in a sulfide plant. Each slab is being monitored for its resistance to saline and acidic liquors along with other conventional sulfur and Portland cement based slabs. Still further, two other prepared slabs designated as slab nos. 25 and 26 in Table 3 below were installed in a copper refinery along with other types of concrete slabs for corrosive test purposes in highly corrosive areas of the refinery. The initial strength characteristics of all prepared slabs are also shown in Table 3.

TABLE 3
SULFUR CONCRETE TEST SLAB DATA

| Slab No. | Location | Strength, psi |  |  |
|---|---|---|---|---|
|  |  | Compressive | Flexural | Tensile |
| 3 | Carlsbad | 3,190 | 930 | 620 |
| 4 | Carlsbad | 3,570 | 980 | 850 |
| 35, 36 | Corpus Christi | 5,030 | 1,205 | 730 |
| 25, 26 | Amarillo | 3,435 | 1,065 | 700 |

EXAMPLE 4

A series of modified sulfur cement based spray coating compositions were formulated from the quantities of ingredients specified in Table 4 below. The various modified sulfur cement formulations were prepared by reacting sulfur and oligomer-dicyclopentadiene mixtures in the quantities described in the footnotes of the table at 130° C. for 24 hours. Samples of the modified sulfur cements were than mixed with fiberglass or mica in the amounts indicated in the table at 140° C. The various formulations were then sprayed upon concrete blocks each 1 ft. square by 1 in. thick to yield coated products wherein the sprayed coatings had the strength properties shown in the table.

TABLE 4
MODIFIED SULFUR SPRAY COATINGS

| Composition, pct | | Impact Strength, in-lb | Flexural Strength, psi |
|---|---|---|---|
| Sulfur | Mica | | |
| 99[1] | 1 | 1.0 | 385 |
| 97[1] | 3 | 1.0 | 575 |
| 95[1] | 5 | 1.5 | 665 |
| 93[1] | 7 | 3.0 | 870 |
| 91[1] | 9 | 3.5 | 1,085 |
| 80[2] | 20 | 11.0 | 2,000 |

TABLE 4-continued
MODIFIED SULFUR SPRAY COATINGS

| Composition, pct | | Impact Strength, in-lb | Flexural Strength, psi |
|---|---|---|---|
| 80[3] | 20 | 12.0 | 2,485 |
| Sulfur | Fiberglass | | |
| 99[1] | 1 | 4.0 | 625 |
| 98[1] | 2 | 7.0 | 850 |
| 97[1] | 3 | 23.0 | 1,100 |

[1] Sulfur modified by reaction with 1 pct DCPD and 1 pct oligomer.
[2] Sulfur modified by reaction with 3.25 pct DCPD and 1.75 pct oligomer.
[3] Sulfur modified by reaction with 2.5 pct DCPD and 2.5 pct oligomer.

EXAMPLE 5

Flexible sulfur paving materials can be formulated by increasing the modifier in the range of >10% by wt. of sulfur. As shown in Table 5 below several paving compositions were prepared by reacting 80%, 70% and 60% sulfur with 20%, 30% and 40% of a DCPD oligomer mixture (80% oligomer- 20% DCPD) at a temperature of 130° C. for a time ranging from 1 hr. to 24 hrs. A typical conventional asphalt material, i.e. AR 4000 West Coast Asphalt, is also shown for comparative purposes. Highly flexible binder materials with characteristics quite similar to asphalt were formulated with the properties shown in the table below.

TABLE 5

| Property | PLASTICIZER (pct.) | | | Ar 4000 West Coast Asphalt |
|---|---|---|---|---|
|  | 20 | 30 | 40 |  |
| Viscosity, 275° F. (CP) | 330 | 450 | 650 | 225 |
| Penetration, 77° F. | 136 | 93 | 66 | 70 |
| Softening point, °F. | 104 | 110 | 116 | 120 |
| Specific gravity | 1.730 | 1.560 | 1.469 | 1.001 |

By using plasticized binder with graded aggregate, pavement values listed in Table 6 were obtained. The modified sulfur cement formulations above containing 30% and 40% DCPD-oligomer mixture were blended in amounts of 6% with 94% of quartz aggregate. Limestone and volcanic aggregate function equally as well.

TABLE 6
MARSHALL PROPERTIES (ASTM)

|  | Plasticizer, pct | | AR 4000 Asphalt |
|---|---|---|---|
|  | 30 | 40 |  |
| Stability, lb | 3,000 | 2,300 | 2,100 |
| Flow, 0.01 in | 10 | 12 | 10 |
| Specific gravity | 2.321 | 2.407 | 2.354 |
| Voids, pct | 3 | 3 | 3 |
| Binder, pct | 6 | 6 | 6 |
| Aggregate, pct | 94 | 94 | 94 |

As indicated the material characteristics are quite similar to asphaltic materials and offer the possibility of a total replacement for asphaltic concrete pavements. The materials are also highly corrosion resistant and show great potential as construction materials for use in many corrosive industrial applications. In highway paving applications the materials should be valuable as corrosion resistant bridge decking.

Having now fully described the invention, it will be apparent to one of ordinary skill in the art that many changes and modifications can be made thereto without departing from the spirit or scope of the invention as set forth herein.

What is new and intended to be secured by Letters Patent is:

1. A modified sulfur cement comprising: the polymeric reaction product of elemental sulfur and from 20 to 40 wt. % of a modifier being the combination of dicyclopentadiene and an oligomeric mixture comprising at least trimers of cyclopentadiene, said sulfur cement having a softening point of no more than 116° F.

2. The modified sulfur cement of claim 1, wherein the sulfur content of said polymeric reaction product ranges from 80 to 60 wt. %.

3. The modified sulfur cement of claim 1, wherein said modifier comprises from 90 wt. % dicyclopentadiene - 10 wt. % oligomer to 0 wt. % dicyclopentadiene - 100 wt. % oligomer.

4. A method of preparing a modified sulfur cement comprising:

reacting sulfur with from 20 to 40 wt. % of a modifier being the combination of dicyclopentadiene and an oligomeric mixture comprising at least trimers of cyclopentadiene said sulfur cement product having a softening point of no more than 116° F.

5. The method of claim 4, wherein said reaction is conducted at a temperature of 115° C. to 180° C.

6. The method of claim 4, wherein said modifier comprises from 90 wt. % oligomer to 0 wt. % dicyclopentadiene - 100 wt. % oligomer.

7. The method of claim 4, wherein from 80 to 60 wt. % sulfur is reacted with said modifier.

* * * * *